3,361,561
ALLOYS FOR SOLDERING CONDUCTORS TO CARBON AND GRAPHITE
Henry J. Pinter, Alliance, Ohio, assignor of twenty-five percent to George E. Schick, Canton, Ohio
No Drawing. Filed Oct. 19, 1964, Ser. No. 404,915
1 Claim. (Cl. 75—175)

My invention relates to improvements in alloys for soldering various forms of common conductors, such as clips, wires, etc., of copper or silver, or alloys thereof, to carbon or graphite in order to provide carbon or graphite products such as brushes, electrical contact points, slip rings, ground anodes for radar, carbon or graphite resistors, etc.

More specifically, my invention relates to alloys which may be weld deposited to carbon or graphite and will form a strong, electrically conducting bond therewith, and to which usual conductors may be then soldered using conventional solder and conventional soldering methods.

The most common method prior to the present invention, for attaching conductors to carbon or graphite for forming carbon or graphite products, such as attaching conductors to carbon for use as carbon brushes in electric motors, has been by use of various forms of pressure clamps or collars whereby the conductors are merely pressure clamped in abutting relationship to the carbon or graphite. None of these prior methods have been entirely satisfactory since the clamped attachment is readily subject to destruction from temperature variations, vibration and other conditions commonly encountered.

To my knowledge, there has never been, prior to my present invention, any alloy known which may be used as an intermediary for providing an electrically conducting, sound soldered bond between common conductors and carbon or graphite. Furthermore, such an alloy will obviously satisfy a long standing want and need.

It is, therefore, a general object of the present invention to provide alloys for soldering conductors to carbon or graphite which solves the foregoing problems and satisfies such needs.

It is a primary object of the present invention to provide alloys for soldering conductors to carbon or graphite which may be weld deposited on the carbon or graphite by the use of conventional welding equipment and will form a base on the carbon or graphite to which usual conductors may be conventionally and securely soldered.

It is a further object of the present invention to provide alloys for soldering to carbon or graphite which will form a sound bond between the conductors and carbon or graphite which is highly resistant to temperature variations and vibrations.

It is still a further object of the present invention to provide alloys for soldering conductors to carbon or graphite in which the electrical conductivity thereof may be varied merely by varying one of the alloying elements.

Finally, it is an object of the present invention to provide alloys for soldering conductors to carbon or graphite which satisfies all of the above objects in a relatively simple manner and at a minimum of cost.

These and other objects are accomplished by the alloys, products, methods and procedures comprising the present invention, preferred embodiments of which—illustrative of the best mode in which applicant has contemplated applying the principles—are set forth in the following description and which are particularly and distinctly pointed out and set forth in the appended claim forming a part hereof.

In general terms, the improvements of the present invention may be stated as including alloys for soldering conductors to carbon or graphite, new carbon or graphite products incorporating such alloys, and new methods for using such alloys for producing carbon or graphite products.

According to the present invention, my new alloys are formed by taking a first alloy element taken from the group and within the range limits consisting of 0.8 to 40 parts by weight of titanium, 0.667 to 40 parts by weight of vanadium, and 1.0 to 40 parts by weight of zirconium, and mix melting this first alloy element with a second alloy element consisting of 200 parts by weight of tin in an inert atmosphere, such as argon or helium, preferably forming a rod of the resulting alloy. In the case where increased electrical conductivity is desired, copper or silver may be added to any of the alloys.

In the case of copper, up to 40 parts may be added to any of the foregoing alloys. In the case of silver, up to 30 parts may be added to the foregoing titanium alloy, up to 40 parts may be added to the foregoing vanadium alloy, and up to 50 parts may be added to the foregoing zirconium alloy. In all cases the copper or silver is added by mix melting in the inert atmosphere.

After the alloys are formed as stated, they are then melt deposited onto the usual commercial carbon or graphite in an inert atmosphere, preferably by weld depositing one of the alloys from the alloy rods previously formed in an argon or helium atmosphere. Both the mix melting and the melt depositing may obviously be accomplished using conventional existing welding equipment, such as inert gas shielded tungsten electrode electric welding apparatus.

It has been found that if the alloys contain less than 0.8 part of titanium, 0.667 part of vanadium or 1.0 part of zirconium to 200 parts of tin, there will be no wetting when it is attempted to weld deposit the particular alloy on the carbon or graphite. Furthermore, when more than 40 parts of titanium, vanadium or zirconium to 200 parts of tin are present, although the particular alloy will properly deposit, edge cracking of the alloy on the carbon or graphite will result.

Using the limits specified, however, that is, 0.8 to 40 parts of titanium, 0.667 to 40 parts of vanadium or 1.0 to 40 parts of zirconium with 200 parts of tin, a strong, sound bond is provided between the particular alloy and the carbon or graphite having reasonable electrical conductivity through the weld deposited alloy and excellent electrical conductivity through the bond between the alloy and carbon or graphite. By adding the copper or silver to any of the alloys within the ranges set forth, the electrical conductivity of the resulting weld deposite alloy may be increased as desired, the greater copper or silver, the greater the increase in electrical conductivity of the alloy, while still resulting in a strong, sound bond between the alloy and the carbon or graphite having excellent electrical conductivity.

Again, it has been found that if greater proportionate amounts of copper or silver than those specified in the foregoing are added to the alloys, edge cracking of the alloys on the carbon or graphite will result.

After the alloys have been deposited on the carbon or graphite, the carbon or graphite products may be completed by conventionally soldering any form of conductor, such as copper or silver conductors, to the alloy in the usual manner and using conventional solder, such as 50% tin and 50% lead. The particular conductor is not critical as long as it is normally capable of being soldered. Furthermore, the exact content of the solder is not critical.

Thus, according to the present invention, particular alloys are provided which will form a strong, sound bond with carbon or graphite and to which conventional conductors may be easily and simply soldered in usual manner. In this way, useful carbon or graphite products may be formed, such as brushes, electrical contact points, slip rings, ground anodes for radar, carbon or graphite resistors, and others.

When the terms "carbon" or "graphite" are used in the foregoing and in the claim, it is not intended to limit the present invention to pure carbon or graphite alone. For instance, various forms or metal particles, such as particles of copper or silver, may be added to the carbon or graphite to increase the electrical conductivity thereof, and such additions are contemplated within these terms.

In the foregoing description, certain terms have been used for brevity, clearness and understanding, but no unnecessary limitations are to be implied therefrom, because such words are used for descriptive purposes herein and are intended to be broadly construed.

Moreover, the embodiments of the alloys, products, methods and procedures described herein are by way of example and the scope of the present invention is not limited, except where specifically set forth, to exact details of construction and procedure described.

Having now described the invention, and the advantageous new and useful results obtained thereby, the new and useful alloys, products, methods and procedures, and reasonable mechanical equivalents thereof obvious to those skilled in the art are set forth in the appended claim.

I claim:
1. An alloy which will bond to carbon and graphite and to which conductors may be soldered essentially consisting of by weight: a first alloy element consisting of 0.667 part of vanadium; a second alloy element consisting of 200 parts of tin; and a third alloy element consisting of 0 to 40 parts of silver.

References Cited
UNITED STATES PATENTS

| | | | |
|---|---|---|---|
| 979,394 | 12/1910 | Rossi | 75—175 |
| 3,119,171 | 1/1964 | Anderson | 29—492 X |

OTHER REFERENCES

Montash Chem. V. 84, 1953, pages 169–180.

Hansen, "Constitution of Binary Alloys," 1958, McGraw-Hill Book Co., New York, relied on pages 1210–1213, 1216, 1217 and 1219–1221.

CHARLES N. LOVELL, *Primary Examiner.*

DAVID L. RECK, HYLAND BIZOT, *Examiners.*